United States Patent
Desai

(10) Patent No.: US 9,679,143 B2
(45) Date of Patent: Jun. 13, 2017

(54) UPDATED IO MEMORY MANAGEMENT UNIT IDENTITY SETTINGS FOR DMA REMAPPING

(71) Applicant: AVAGO TECHNOLOGIES GENERAL IP (SINGAPORE) PTE. LTD., Singapore (SG)

(72) Inventor: Kashyap Dushyantbhai Desai, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 630 days.

(21) Appl. No.: 14/135,912

(22) Filed: Dec. 20, 2013

(65) Prior Publication Data
US 2015/0127871 A1 May 7, 2015

(30) Foreign Application Priority Data
Nov. 6, 2013 (IN) .......................... 5002/CHE/2013

(51) Int. Cl.
*G06F 13/28* (2006.01)
*G06F 21/57* (2013.01)

(52) U.S. Cl.
CPC ............ *G06F 21/572* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 7,194,660 B2* | 3/2007 | Edrich | G06F 11/2284 711/150 |
| 2010/0011147 A1* | 1/2010 | Hummel | G06F 9/45558 711/6 |
| 2013/0298124 A1* | 11/2013 | Vembu | G06F 9/4403 718/1 |

* cited by examiner

*Primary Examiner* — Ilwoo Park
(74) *Attorney, Agent, or Firm* — Sheridan Ross P.C.

(57) ABSTRACT

Disclosed is a system and method for updating IOMMU (Input Output Memory Management Unit) tables for remapping DMA (Direct Memory Access) range for a requested bus device when the device is active.

20 Claims, 11 Drawing Sheets

410
dmar: RMRR base: 0x000000cf458000 end: 0x000000cf46ffff
dmar: RMRR base: 0x000000cf450000 end: 0x000000cf450fff
dmar: RMRR base: 0x000000cf452000 end: 0x000000cf452fff 420  IOMMU: Setting RMRR:
IOMMU: Setting identity map for device 0000:00:1d.0 [0xcf452000 - 0xcf453000]
IOMMU: Setting identity map for device 0000:00:1a.0 [0xcf450000 - 0xcf451000]
IOMMU: Setting identity map for device 0000:00:1a.0 [0xcf458000 - 0xcf470000]
IOMMU: Setting identity map for device 0000:00:1d.0 [0xcf458000 - 0xcf470000]

Fig. 4

UPDATED IO MEMORY MANAGEMENT UNIT IDENTITY SETTINGS FOR DMA REMAPPING

FIELD OF THE INVENTION

The field of the invention relates generally to input/output memory management units.

BACKGROUND OF THE INVENTION

IO Memory Management Units play an important role in memory access operations. An input/output memory management unit (IOMMU) is a memory management unit (MMU) that connects a DMA-capable I/O bus to the main memory. Like a traditional MMU, which translates CPU-visible virtual addresses to physical addresses, the IOMMU maps device-visible virtual addresses (also called device addresses or I/O addresses in this context) to physical addresses. Some units also provide memory protection from faulty devices. An example IOMMU is the graphics address remapping table (GART) used by AGP (Accelerated Graphics Port) and PCI Express graphics cards. I/O virtualization is not performed by the CPU, but instead by a chipset.

SUMMARY OF THE INVENTION

An embodiment of the present invention may therefore comprise a method of identity map update for an IO memory management unit, said method comprising: allocating, at a pre-boot component, a memory region, informing bus firmware component of said allocation, and updating a direct memory access remapping table; accessing, at said firmware component, said allocated memory region; reading, at an operating system component, said allocated memory range and updating said IO memory management unit identity map; and providing access to said memory range based on said identity map.

An embodiment of the present invention may further comprise a method of I/O memory management, said method comprising: at pre-boot, allocating a memory range for a bus device; providing the allocated range to a bus firmware; at said bus firmware, querying said bus driver about said memory range for said bus device; at said bus driver, validating said memory range.

An embodiment of the present invention may further comprise a system for updating an identity map for an IO memory management unit, said system comprising: a pre-boot component enabled to allocate a memory region and inform bus firmware of said allocation and to update a direct memory access remapping table; said firmware component enabled to access said allocated memory region; an operating system component enabled to read said memory range provided by said direct memory access remapping table and update said IO memory management unit identity map; and an IO memory management unit enabled to provide access to said memory range based on said identity map.

BRIEF DESCRIPTION OF THE DRAWINGS

FIG. 4 is a diagram of an identity map update process for IOMMU from pre-boot and firmware.

DETAILED DESCRIPTION OF THE EMBODIMENTS

Figure 1:
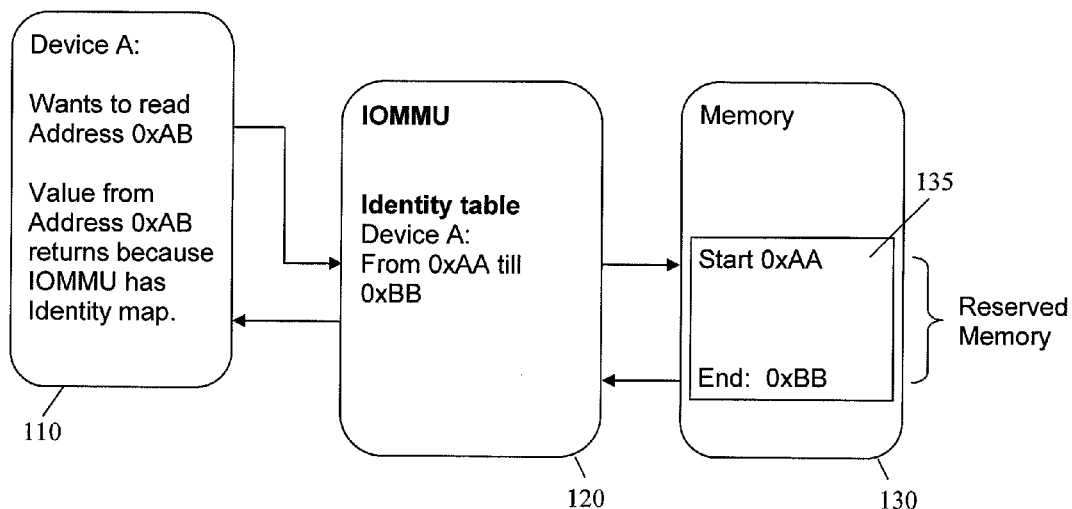
FIG. 1 shows an IOMMU memory access.

Using IOMMU, large regions of memory can be allocated without the need to be contiguous in physical memory—the IOMMU maps contiguous virtual addresses to the underlying fragmented physical addresses. Thus, the use of vectored I/O (scatter-gather lists) can sometimes be avoided. Devices that do not support memory addresses long enough to address the entire physical memory can still address the entire memory through the IOMMU, avoiding overheads associated with copying buffers to and from the peripheral's addressable memory space. For example, as of 2010 x86 computers can use more than 4 gigabytes of memory, enabled by the PAE feature in an x86 processor. An ordinary 32-bit PCI device simply cannot address the memory above the 4 GiB boundary, and thus it cannot directly access it. Without an IOMMU, the operating system would have to implement time-consuming bounce buffers (also known as double buffers). Memory is protected from malicious and misbehaving devices; a device cannot read or write to memory that hasn't been explicitly allocated (mapped) for it. The memory protection is based on the fact that OS running on the CPU exclusively controls both the MMU and the IOMMU. The devices are physically unable to circumvent or corrupt configured memory management tables. In virtualization, guest operating systems can use hardware that is not specifically made for virtualization. Higher performance hardware such as graphics cards use DMA to access memory directly; in a virtual environment all memory addresses are re-mapped by the virtual machine software, which causes DMA devices to fail. The IOMMU handles this re-mapping, allowing the native device drivers to be used in a guest operating system. In some architectures IOMMU also performs hardware interrupt re-mapping, in a manner similar to standard memory address re-mapping. Peripheral memory paging can be supported by an IOMMU. A peripheral using the PCI-SIG PCIe Address Translation Services (ATS) Page Request Interface (PRI) extension can detect and signal the need for memory manager services. For system architectures in which port I/O is a distinct address space from the memory address space, an IOMMU is not used when the CPU communicates with devices via I/O ports. In system architectures in which port I/O and memory are mapped into a suitable address space, an IOMMU can translate port I/O accesses.

When an operating system is running inside a virtual machine, including systems that use paravirtualization, such as Xen (a hypervisor allowing multiple computer operating systems to execute on the same computer hardware concurrently), it does not usually know the host-physical addresses of memory that it accesses. This makes providing direct access to the computer hardware difficult, because if the guest OS tried to instruct the hardware to perform a direct memory access (DMA) using guest-physical addresses, it would likely corrupt the memory, as the hardware does not know about the mapping between the guest-physical and host-physical addresses for the given virtual machine. The corruption is avoided because the hypervisor or host OS intervenes in the I/O operation to apply the translations, causing a delay in the I/O operation. An IOMMU can solve this problem by re-mapping the addresses accessed by the hardware according to the same (or a compatible) translation table that is used to map guest-physical address to host-physical addresses.

Embodiments of the invention provide methods and systems to update IOMMU tables for remapping a DMA range for a requested bus device. This occurs only when a device is active. In general, when IOMMU is present in a system, all bus devices access memory via a IOMMU path. The operating system will grant access for a given bus device for the requested memory. The operating system will read the DMAR (DMA Remapping) table and update the IOMMU. This will provide a range of the memory associated with the buss device. For purposes of this description, this is termed setting the identity for the bus device for a given memory range. Without the identity set, the device is unable to access the memory region which is supposed to be the correct memory range for that device.

One of the purposes of the IOMMU is to restrict memory access from unauthorized context in SRIOV (Single Root IO Virtualization) and MRIOV (Multi Root IO Virtualization) (PCI virtualization) mode. It is understood by those skilled in the art that IO virtualization is different than server virtualization. However, IO virtualization may be complimentary to server virtualization. Essentially, virtualization separates the physical from the logical. Virtual machines allow use of a machine without the overhead of new hardware. In the IO context, IO virtualization allows a simplified management and improved performance of servers in enterprise environments. IO virtualization environments are generally created by abstracting the upper layer protocols from the physical connections.

One method of providing settings for an identity map is to read a DMAR table which was created at pre-boot and then set the identity map. It may not always be practical, or possible, to see all devices that are entered in a memory range at pre-boot time. Having a DMAR table set at pre-boot provides difficulties to updating an IOMMU table for identity settings. Additional intelligent may be provided to a bus driver to enable handling of all devices. This is since a bus driver will interact directly with underlying firmware and will accordingly "know" the memory requirements for any given device. The bus driver can post the same memory range for a given bus device at run time (when a device is operational) to the IOMMU for identity settings.

FIG. 1 shows an IOMMU memory access. A device A 110 will request to read a certain address of a memory 135. This request will be sent to the IOMMU 120 which will access an identity table for device A 110. The identity table will show an associated memory range 135 in the memory 130. The associated information will be retrieved and sent to Device A 110 because the IOMMU has an identity map.

Figure 2:
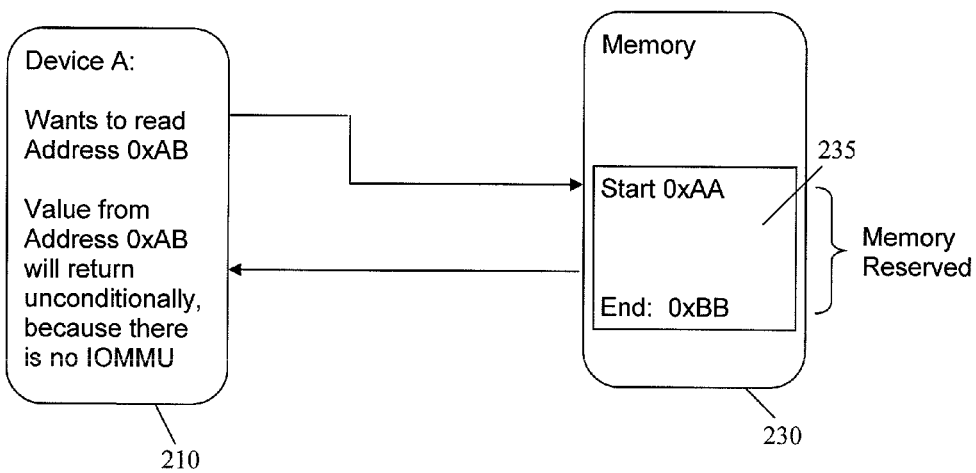
FIG. 2 shows a memory access without an IOMMU.

FIG. 2 shows a memory access without an IOMMU. A device A 210 will request to reads a certain address of a memory 235. The device A 210 will access the memory range directly and values from a range 235 will be returned unconditionally because there is no IOMMU to provide identity table access.

Figure 3:
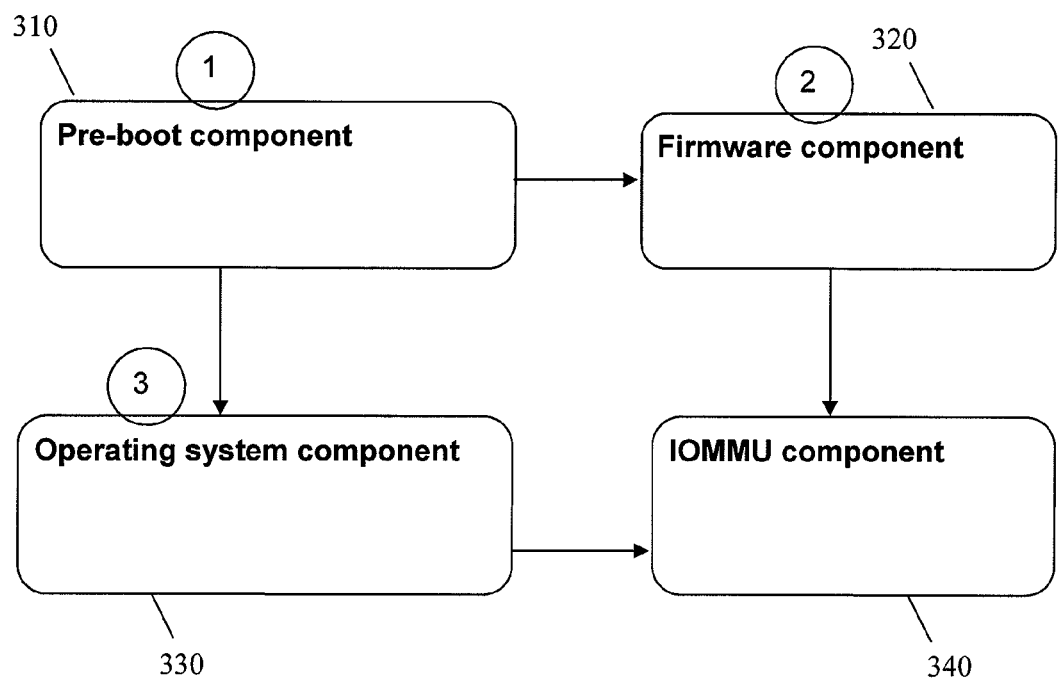
FIG. 3 is a diagram of an identity map update process for IOMMU only from pre-boot.

FIG. 3 is a diagram of an identity map update process for IOMMU only from pre-boot. As discussed, in an embodiment of the invention the IOMMU will update the identity map. A first step is a pre-boot component 310. When a pre-boot component executes a memory allocation for a bus devise, it will also update the DMAR table. The DMAR table is part of pre-boot component functionality which will be accessible by an operating system component. As will be discussed the operating system component will ultimately deliver the request to the IOMMU Step 310 may funnel into either a firmware component step 320 or an operating system component step 330, or both. In the firmware component step 320, a device's firmware will start accessing the provided memory region. The Operating system component 330 will read the memory range provided by the DMAR table and update the IOMMU with the identity map. Memory access will proceed through the IOMMU component 340 and will restrict, or allow, access based on an identity map. Bus firmware will trust that the memory region allocated by pre-boot is valid and that it has access to those regions even if the IOMMU is present. Basically, the bus firmware is unaware if an IOMMU is enabled, or disabled, in the system.

FIG. 4 is a diagram of an identity map update process for IOMMU from pre-boot and firmware. When an operating system loads and IOMMU driver, it will read a DMAR. A sample DMAR table 410 is shown. From the DMAR table, the operating system will provide an identity map 420 for PCI devices to the range provided by the DMAR table 410. The identity map will show the mapping of the PCI device to a memory range. As is understood, identity mapping is a one-to-one mapping of a user identity between two servers so that the proper authorization decisions are made by downstream servers. Identity mapping is necessary when the integration of servers is needed, but the user registries are different and not shared between the systems.

In an embodiment of the invention, the IOMMU table only gets updated if the bus device is operational. This will save inactive entries in the IOMMU table which can be used by other bus devices. A bus device supports SRIOV, or MRIOV, or both, and has capacity to support an amount of virtual functionality. Out of the number of virtual functions that are supported, only a fraction of those would be currently active, i.e. running. Accordingly, by not providing updates for inactive devices, an amount of waste can be avoided. Setting a DMAR table may be option for a variety of bus devices and may not be possible is some situations. Accordingly, embodiments of this invention provide a method and system for updating IOMMU identity tables. With these embodiments, firmware will resort to a safe mode and still provide basic functionality.

Figure 5:
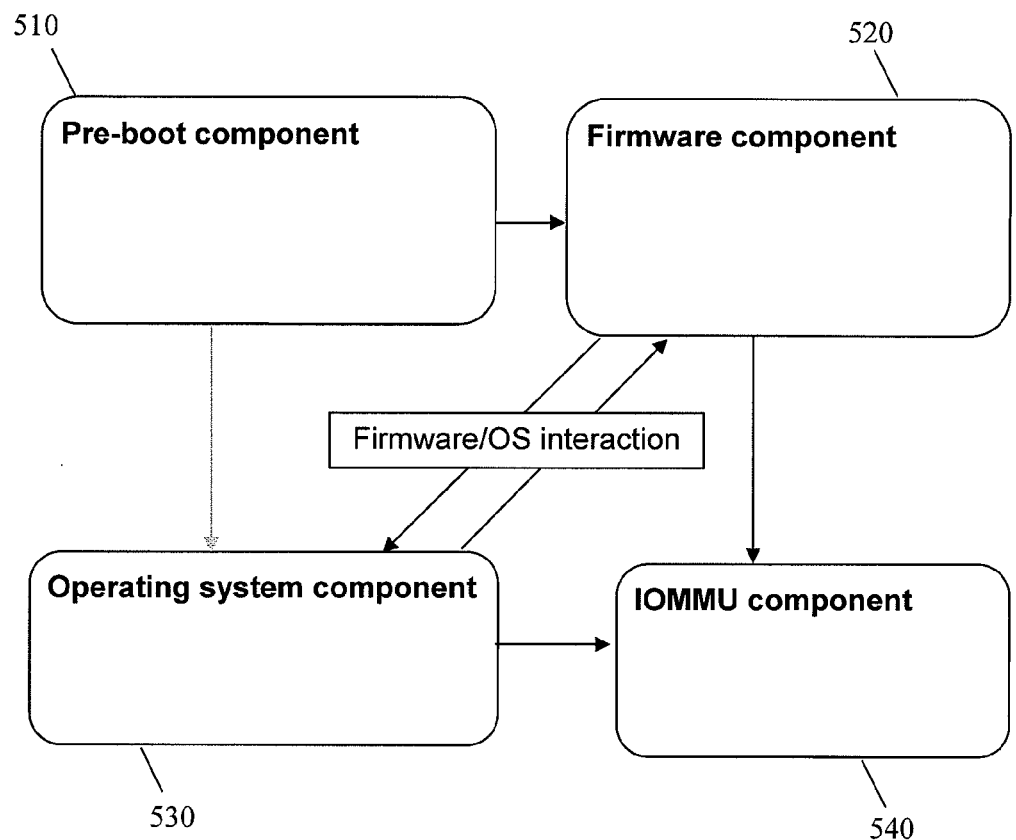
FIG. 5 shows an identity map update process for IOMMU from pre-boot and firmware.

FIG. 5 shows an identity map update process for IOMMU from pre-boot and firmware. A pre-boot component 510 allocates a memory region and provides information about that memory region to bus firmware. Concurrently, the pre-boot component 510 updates the DMAR mapping table. There may be a possibility that the pre-boot component 510 does not update the DMAR table. A firmware component 520 will start accessing the provided memory region based on information received from the pre-boot component 510. Before the firmware access the memory region of interest, it will verify with the operating system component 530 the identity map update via the IOMMU. The operating system component 530 will reply with a status to the firmware component 520. If it is confirmed that the identity map is updated with the IOMMU, the firmware component 520 will use the memory region. Otherwise, the firmware component will fall back to safe mode. In this matter, the operating system component 530 will attempt to set the identity map from the information provided by firmware instead of waiting for a DMAR table update. The operating system component 530 will also read the memory range provided by the DMAR table and update the IOMMU with the identity map. The IOMMU component 540 provides access and will allow, or restrict, data access based on information in the identity map.

In embodiments of the invention, bus firmware is responsible to query device drivers about accessibility of a given memory region. Bus firmware is able to start access to those memory regions if it received positive acknowledgement from the bus driver. If memory regions are not valid for a device, a safe mode of operation may be invoked. As is understood, safe mode is where a device does not use a memory region, but other operations continue. Invalid memory access may result if IOMMU tables are not updated with identity settings in situations where a bus device accesses a memory region without any interaction with bus drivers.

When a bus device queries a bus driver, it will provide the memory range which it received from pre-boot. Using the same range, the bus driver will ask the operating system component to verify if the identity set is updated with those values in the IOMMU identity table. If not, the bus driver will make a request to update the table and will become a bridge for the bus device to update the identity settings in the IOMMU. In addition, there is additional efficiency in the bus device firmware about memory access permissions in case of a present IOMMU where the bus device firmware is able to disable a number of features which require host memory access via the IOMMU.

Embodiments of this invention resolve issues of invalid memory access in cases where an IOMMU is present and an identity map is not updates by pre-boot. Also allowed for is an interface between a bus device and a bus driver which can introduce an additional level of functionality, referred to herein as the safe mode for the bus device, which will maintain the system in working condition by limiting available features.

As is accordingly understood, during pre-boot, a memory range is allocated for a bus device and the allocated range is provided to bus firmware. The bus firmware will query the bus driver about the memory range to the given bus device. The bus driver will validate the request by providing, via the bus firmware. The bus driver will return a successful validity response and the bus firmware will continue with the memory access. If the bus driver returns a failed validity response, then the bus firmware will continue in safe mode where it will not attempt to access the host memory location acquired by pre-boot noted above.

Figure 6:
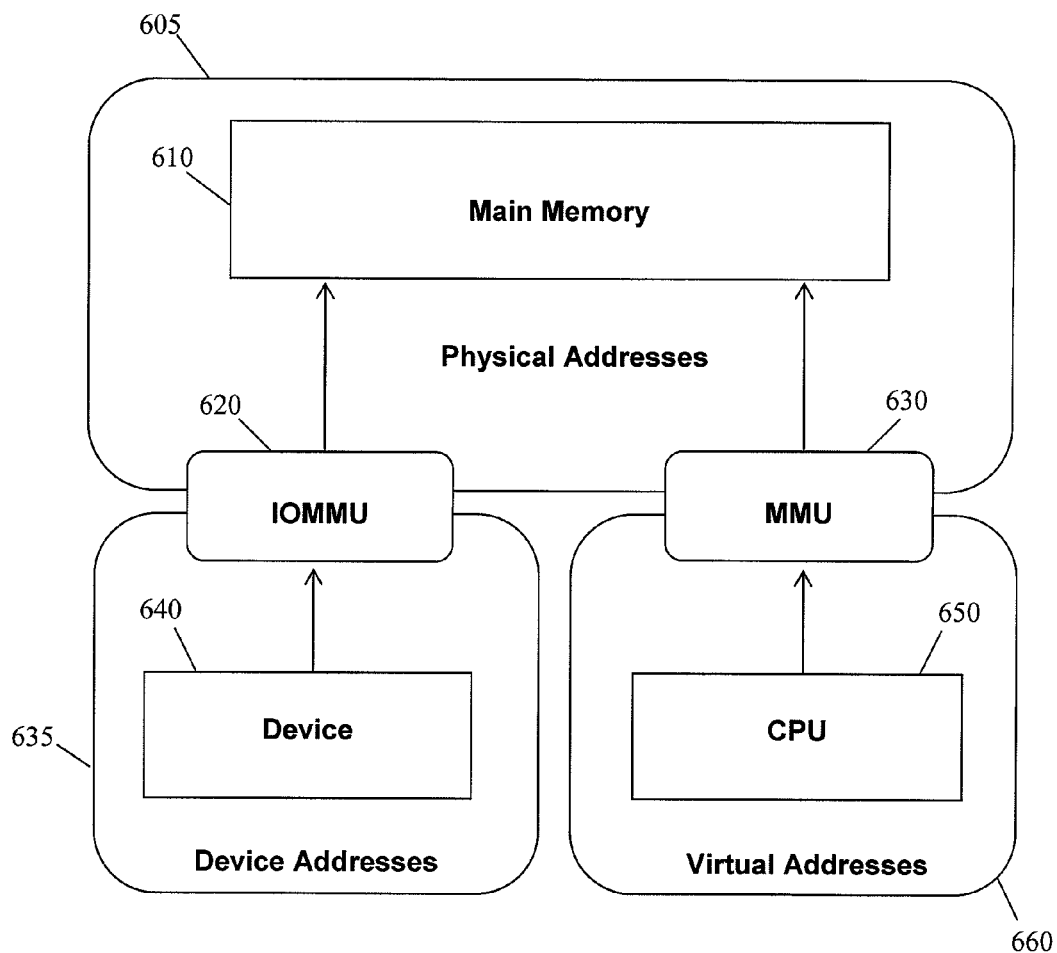
FIG. 6 is an IO memory management unit overview.

FIG. 6 is an IO memory management unit overview. A CPU accesses a main memory 610 via a MMU (Memory Management Unit) 630 and will perform basic translation of virtual memory 660 to physical memory 610, and physical memory 610 to virtual memory 660. The virtual memory and physical memory aspects are from the CPU point of view. A device 640 accesses a main memory 610 via an IOMMU 620 and will perform basic translation of device addresses 635 to physical memory 610, and physical memory 610 to device addresses 635. The IOMMU 620 is an internal component of a Chipset and is often referred to as an extension, for example in terminology such as "Intel's VT-d/VAND IOMMU extension".

An IOMMU extension 620 may perform I/O device assignment. This feature allows an administrator to assign I/O devices to virtual memory locations in any desired configuration. An IOMMU extension 620 may also perform DMA (Direct Memory Access) remapping. This feature allows support for address translations for device DMA data transfers. An IOMMU 620 may also perform interrupt remapping. This provides virtual memory routing and isolation of device interrupts. An IOMMU 620 may also provide reliability features. This will allow for reporting and recording of systems software DMA and interrupt errors that may otherwise corrupt memory that may impact virtual memory isolation.

Essentially, an IOMMU is a hardware component that provides two main functions: I/O translation and device isolation. The IOMMU translates memory addresses presented by devices from "I/O space" to "machine space" to allow a particular device to access physical memory potentially out of its range. It does this by providing an "in range" address to the device and translating the "in range" address to the physical memory address on the fly. The same translation function, when coupled with access permissions, such as "who can access this memory?", can limit the ability of devices to access specific regions of memory. Further, IOMMUs may be programmed so that the memory region appears to be contiguous to the device on the bus (scatter/gather coalescing).

As is understood, virtualization technology may include CPU virtualization, memory virtualization and I/O virtualization. Further, without a hardware IOMMU, earlier operating systems may have utilized software based IOMMUs. These may have been referred to as SWIOTLB/bounce buffers in linux. An SWIOTLB is a Software I/O Translation Lookaside Buffer. SWIOTLB is a software implementation of the translation function of an IOMMU. These are known as "bounce buffers".

Figure 7:
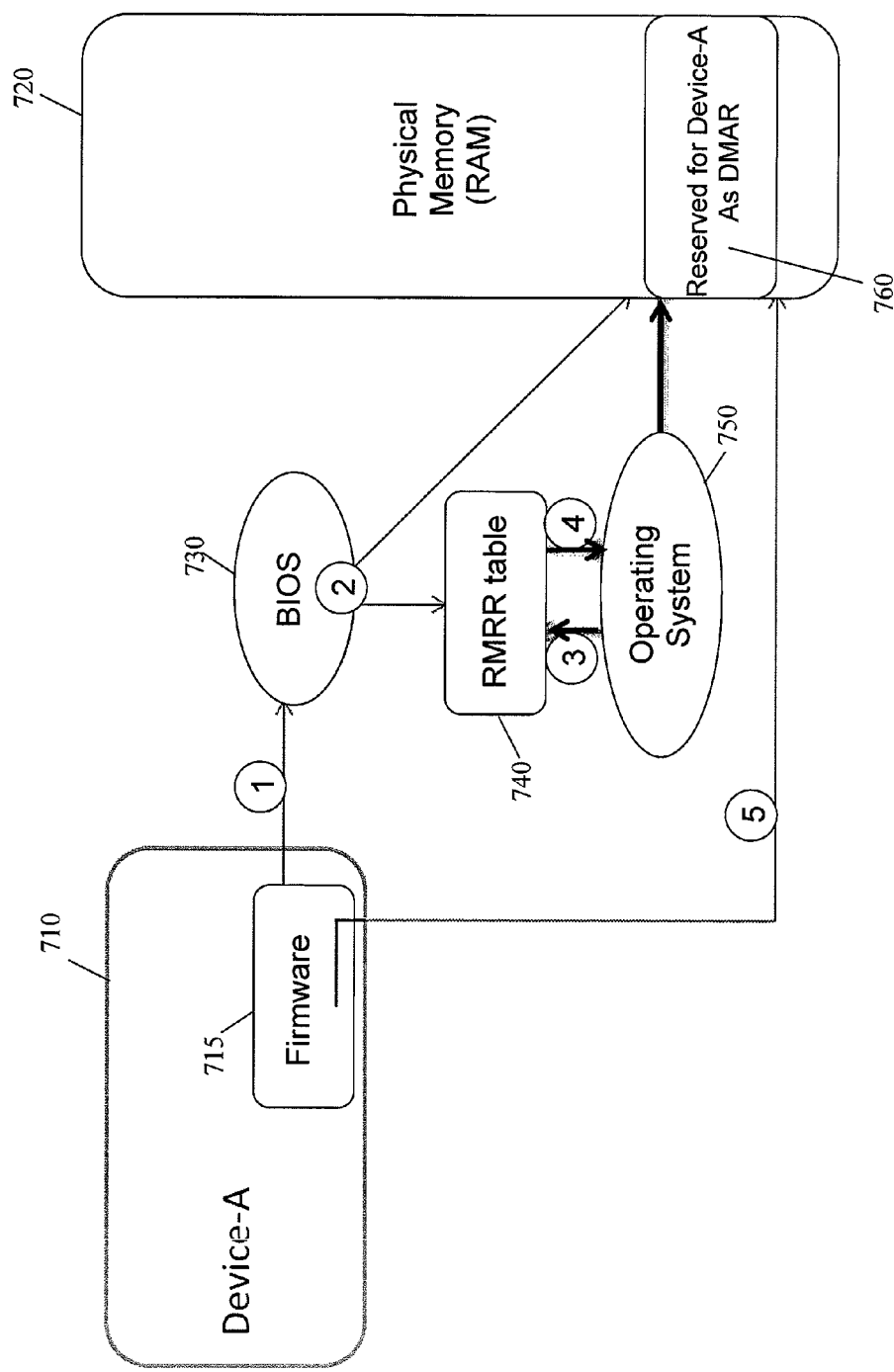
FIG. 7 is an identity map setup operation.

FIG. 7 is an identity map setup operation. In flow 1, firmware 715 of device-A 710 requests BIOS to reserve memory in RAM for Device-A 710. BIOS 730 is understood to be a Basic I/O System. As is also understood, a BIOS provides an abstraction layer for hardware. In flow 2, the BIOS 730 reserves memory in RAM 720 an creates an RMRR table 740. RMRR is Reserved Memory Region Reporting structure. There are some devices the BIOS controls, for example US B devices which perform PS2 (Play Station 2) emulation. The regions of memory used for these devices are marked reserved in the e820 map. e820 is shorthand to refer to the facility by which the BIOS of x86-based computer systems reports the memory map to the operating system or boot loader. When DMA translation is enabled, direct memory access to those regions will fail. Accordingly, BIOS uses RMRR to specify these regions along with devices that need to access these regions. The Operating System will setup unity mappings for these regions for these devices to access these regions. In flow 3, the Operating System 750 will read the RMRR table 740. In flow 4, the Operating System 750 will utilize the RMRR table 740 and setup an identity map for reserve memory for Device-A 710. In flow 5, the firmware will begin using the reserved memory in RAM 760.

Figure 8:
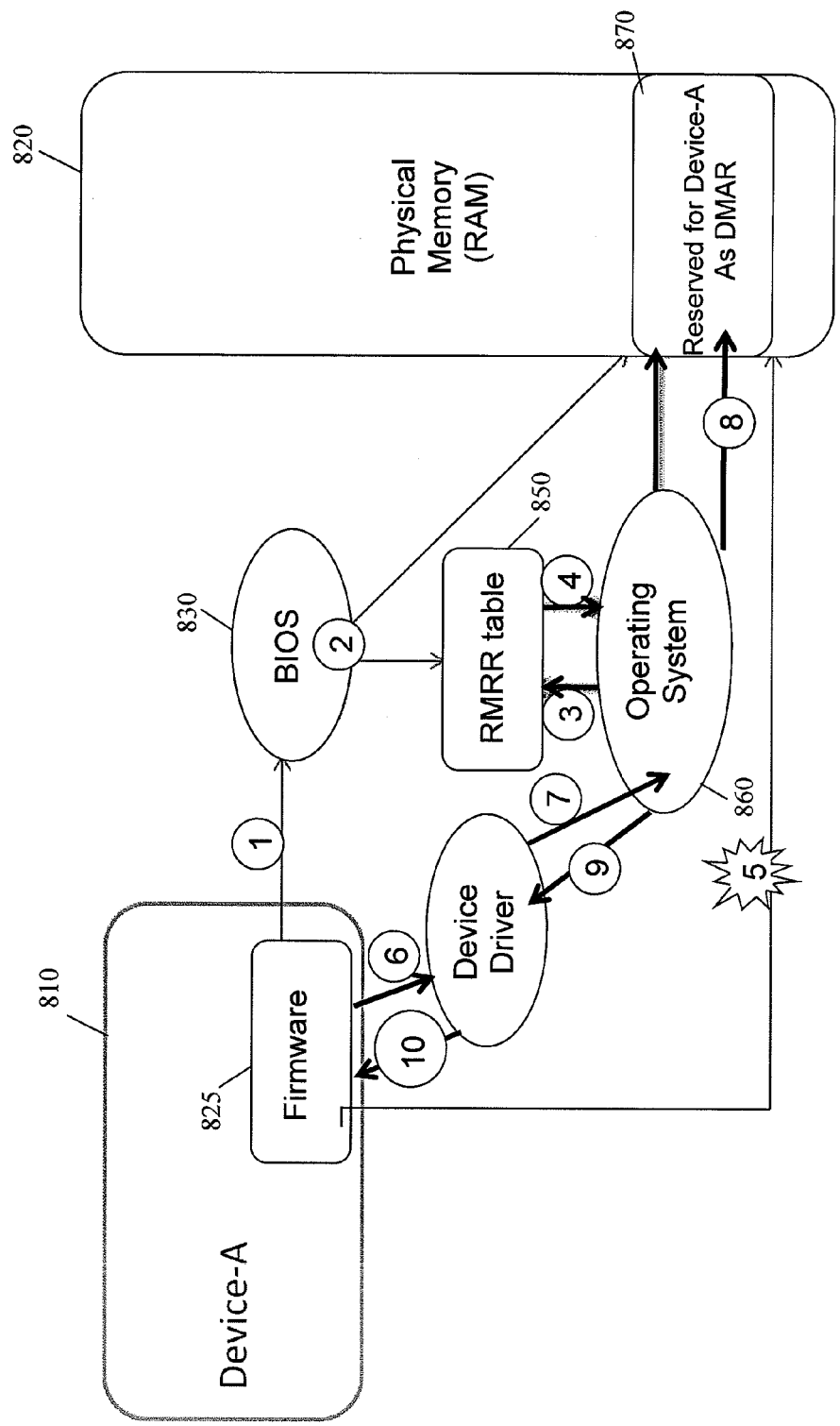
FIG. 8 is an IO memory management unit map update via a device driver on the fly.

In an embodiment of the invention as shown in FIG. 8, an IO memory management unit map update via a device driver on the fly. In flow 1, Device-A 810 firmware 825 requests the BIOS 830 to reserve memory in RAM 820 for Device-A 810. In flow 2, the BIOS 830 reserves memory 870 in RAM 820 and creates an RMRR table 850. The memory reserved for Device-A 810 in RAM 820 is reserved as DMAR (DMA remap). In flow 3, the Operating System 860 reads the RMRR table 850. In flow 4, the Operating System 860 uses the RMRR table 850 and setup identity map for reserve memory for Device-A 810. The firmware, in flow 5 (not shown), is unable to use the reserved memory 870 until a Device Driver 840 allows access to the firmware 825. In flow 6, the firmware 825 interacts with the Device Driver 840 regarding the reserved memory section 870. This may comprise providing the range of memory to the Device Driver 840. In flow 7, the Device Driver 840 communicates with the Operating System 860. In flow 8, the Operating System 860 will correct the identity map, if possible, and provide access to the Device Driver 840. In flow 9, the Operating system 860 will return the status to the Device Driver 840. In flow 10, the Device Driver returns the status to firmware 825.

Figure 9:
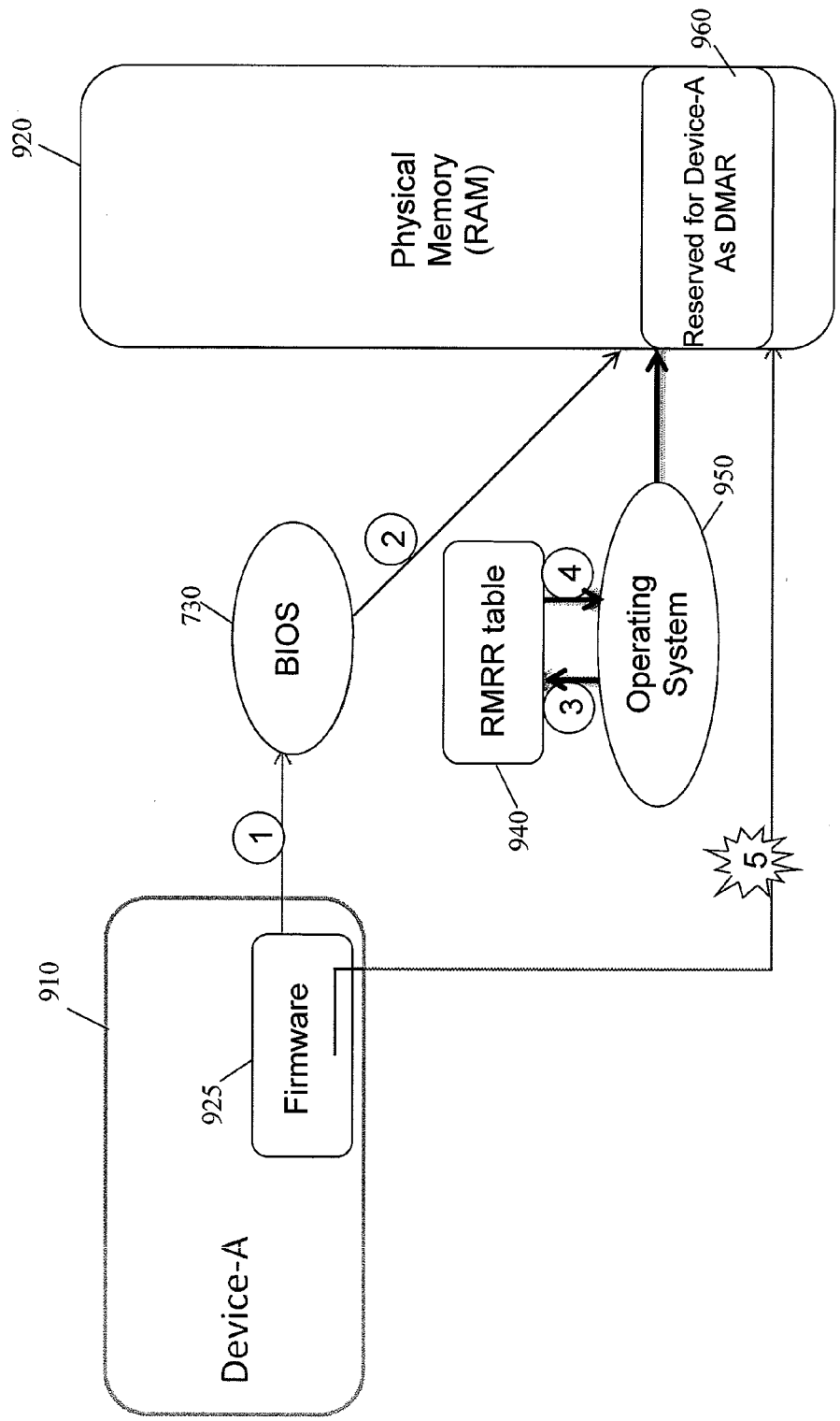
FIG. 9 is a Reserved Memory Region Reporting structure table not updated and a resulting read/write fault.

FIG. 9 is a Reserved Memory Region Reporting structure table not updated and a resulting read/write fault. In flow 1, the firmware 925 of Device-A 910 requests BIOS 930 to reserve memory in RAM 920. The BIOS 930 reserves the memory in RAM 920. However, the BIOS 930 did not create an RMRR table 940 as FIG. 8. The Operating System 950 reads the RMRR table in flow 3. In flow 4, since there is no entry in the RMRR table 940 regarding Device-A 910, the Device-A 910 identity settings are not performed by the Operating System 950. In flow 5, firmware 925 attempts to access the memory region 960 reserved by the BIOS 930. The firmware is restricted by the IOMMU.

Figure 10:
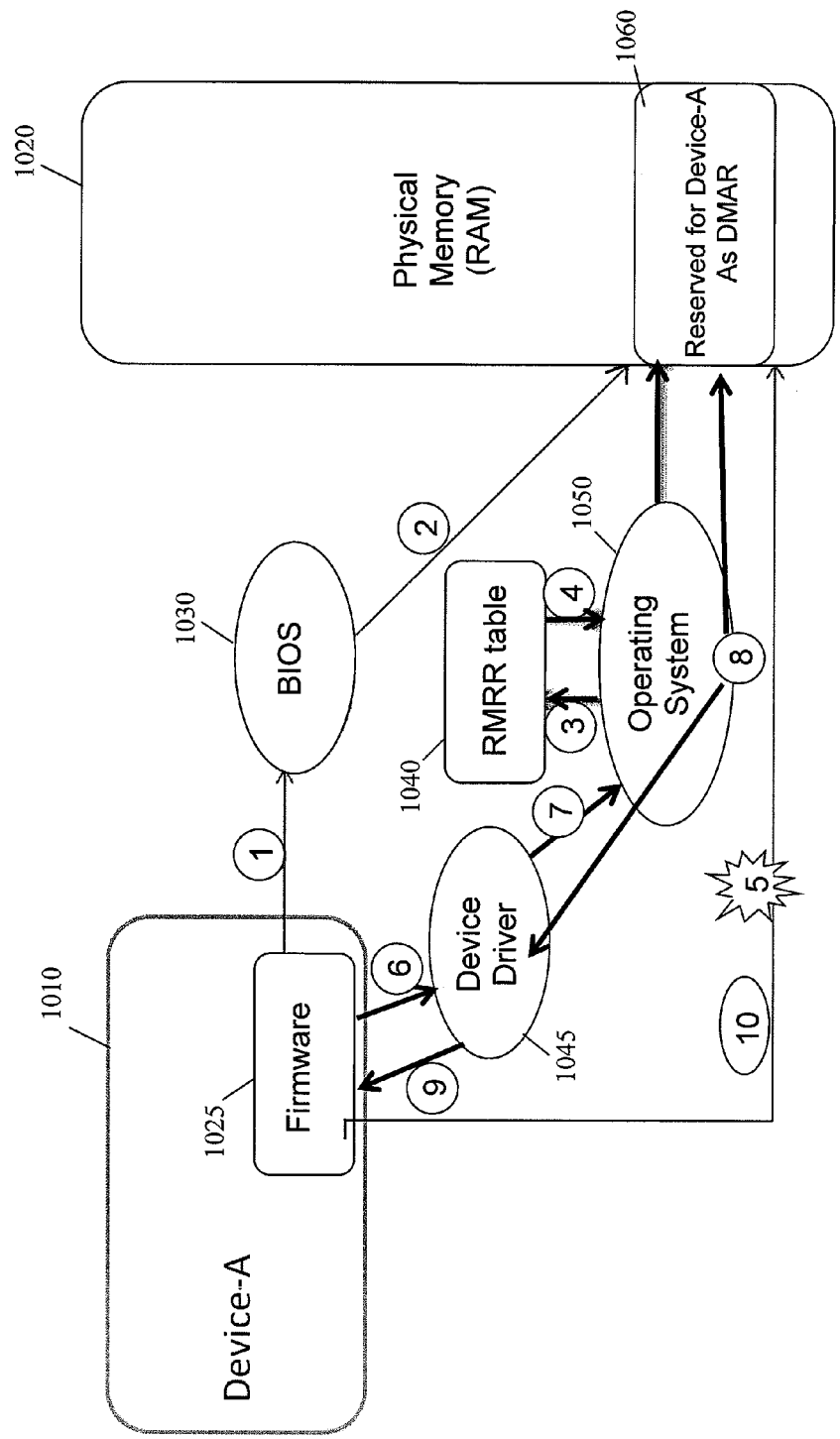
FIG. 10 is a normal firmware operation mode with a Reserved Memory Region Reporting structure table not updated.

FIG. 10 is a normal firmware operation mode with a Reserved Memory Region Reporting structure table not updated. In flow 1, the firmware 1025 of Device-A 1010 requests BIOS 1030 to reserve memory in RAM 1020. In flow 2, the BIOS 1030 reserves the memory 1060 but does not create an RMRR table 1040. In flow 3, the Operating system 1050 reads the RMRR tables 1040. In flow 4, since there is not entry about Device-A 1010 in the RMRR tables 1040, Device-A 1010 identity settings are not done by the Operating System 1050. In flow 5, the firmware 1025 cannon use the reserved memory 1060 until, and unless, the Device Driver 1045 allows access to the firmware 1025. In flow 6, the firmware 1025 interacts with the Device Driver 1045 regarding the reserved memory section 1060. This interaction may comprise providing the range of memory 1060 to the Device Driver 1045. In flow 7, the Device Driver 1050 checks with the Operating System 1050. In flow 8, the Operating System corrects the identity map and acknowledges the correction to the Device Driver 1045. In flow 9, the Device Driver 1045 returns the acknowledged status to the firmware 1025. In flow 10, the firmware 1025 accesses the reserved memory 1060 in Ram 1020.

Figure 11:
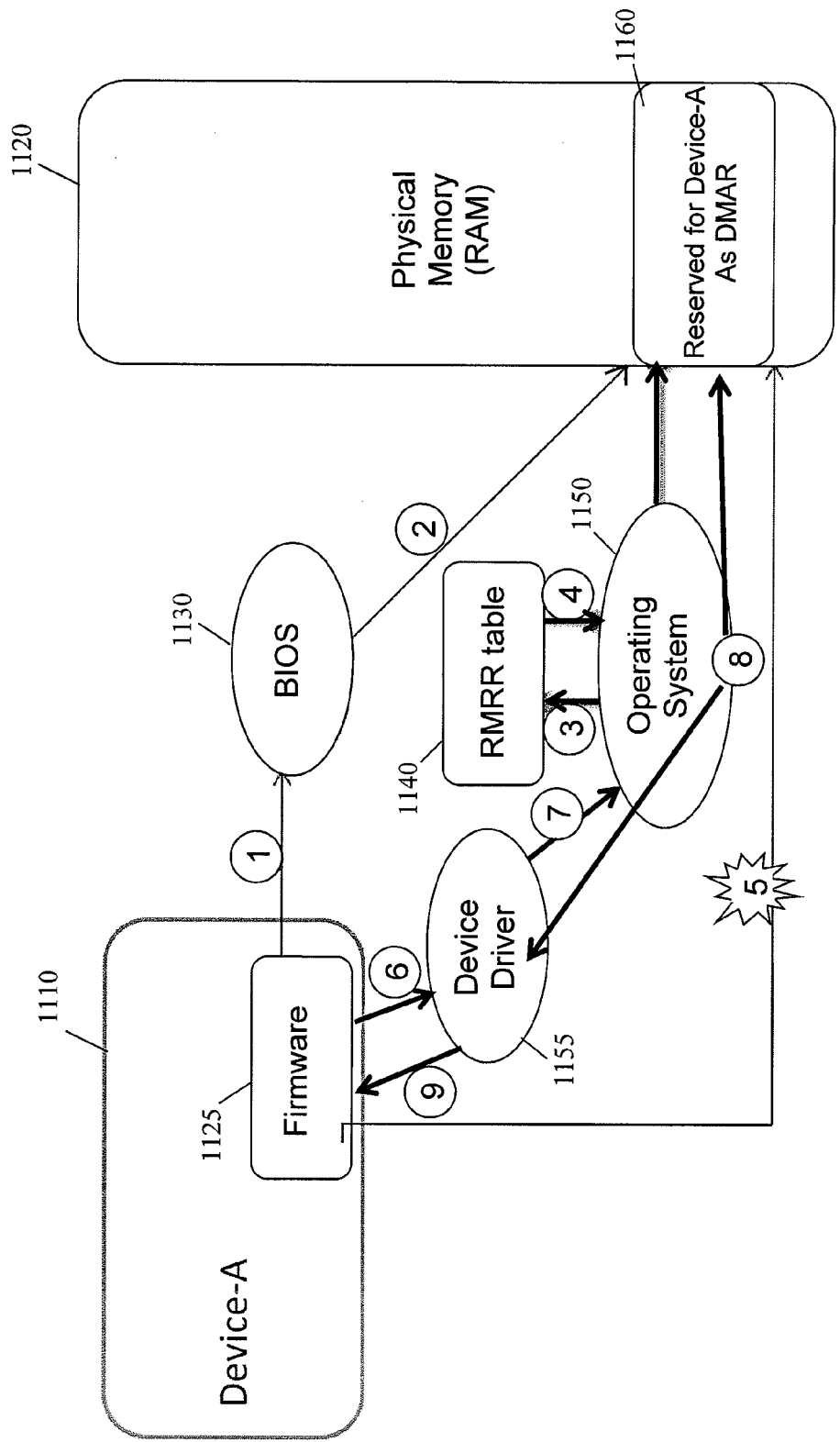
FIG. 11 is Firmware in safe mode operation mode with a Reserved Memory Region Reporting structure table not updated.

FIG. 11 is Firmware in safe mode operation mode with a Reserved Memory Region Reporting structure table not updated. In flow 1, firmware 1125 of Device-A 1110 requests BIOS 1130 to reserves memory in RAM 1120. In flow 2, BIOS reserves memory 1160 in RAM 1120 but does not create an RMRR table 1140. In flow 3, the Operating System 1150 reads the RMRR table 1140. In flow 4, since there is no entry regarding Device-A 1110, entry of Device-jA 1110 identity settings is not done by the Operating System 1150. In flow 5, Firmware 1125 cannot use the reserved memory 1160 until, and unless, the Device Driver 1155 allows access to the firmware 1125. In flow 6, the firmware 1125 interacts with the Device Driver 1155 regarding the reserved memory 1160. In flow 7, the Device Driver 1155 checks with the Operating system 1150 regarding the reserved memory 1160. In flow 8, the Operating system 1150 is unable to correct the identity map and responds to the Device Driver 1155 with a negative acknowledgement. In flow 9, the Device Driver 155 returns the negative acknowledgement information to the firmware 1125. In flow 10 (not shown), the firmware cannot access the reserved memory 160. Safe mode is initiated.

Figure 12:
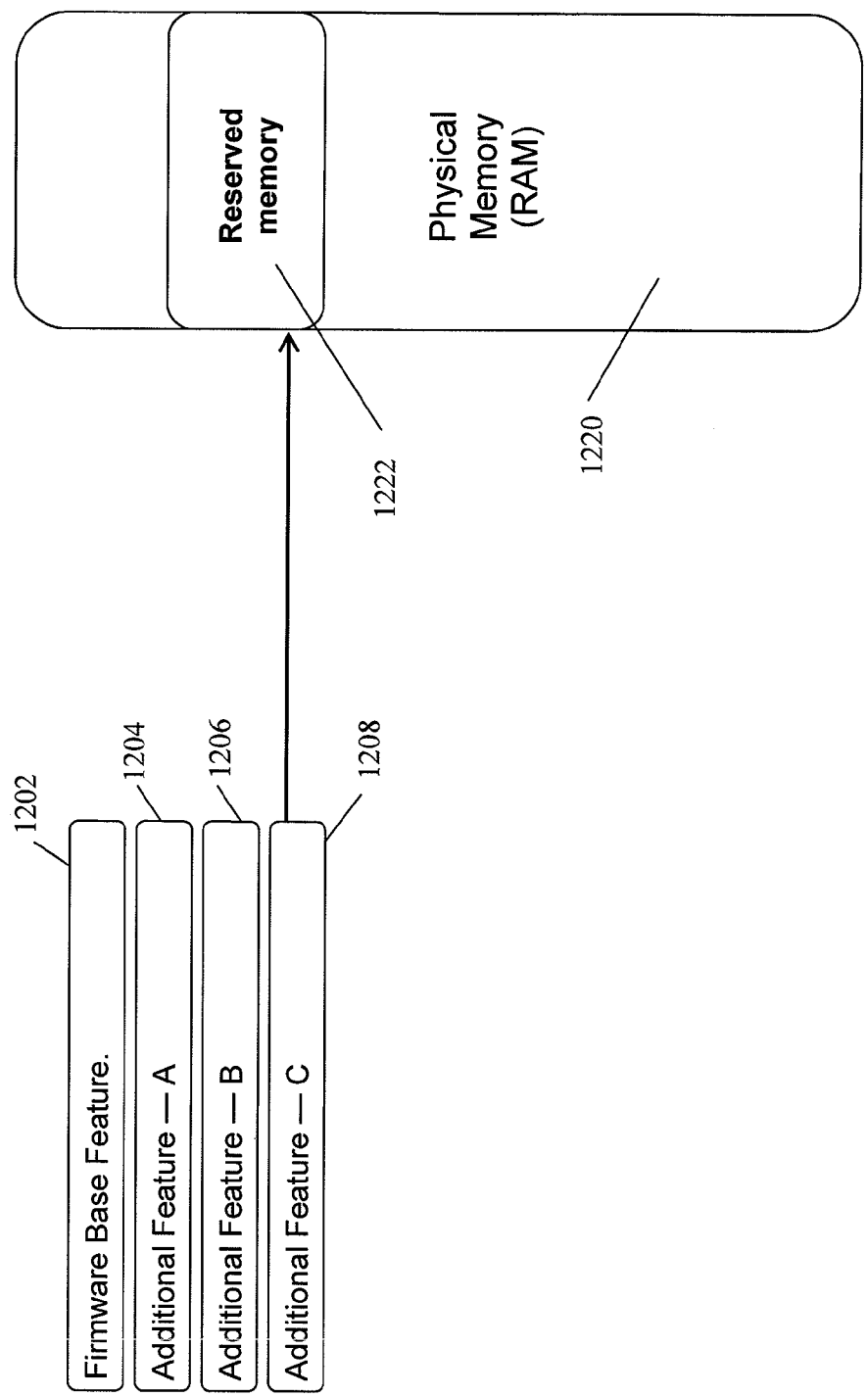
FIG. 12 is a Firmware safe mode operation.

FIG. 12 is a Firmware safe mode operation. A firmware representation shows a firmware base feature 1202, an additional feature-A 1204, and additional feature-B 1206 and an additional feature-C 1208. The base feature 1202 is able to function without reserved memory 1222 from RAM 1220. Feature-A 1204 and feature-B 1206 are also able to function without reserved memory 1222 from RAM 1220. Feature-C 1208 depends on reserved memory 1222 in RAM 1220. In safe mode, the firmware will turn off all features which depend on reserved memory 1220 in RAM 1220. Accordingly, feature-C 1208 is turned off in firmware safe mode.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of identity map update for an IO memory management unit, said method comprising:
   allocating, at a pre-boot component, a memory region, informing a bus firmware component of said allocation, and updating a direct memory access remapping table;
   accessing, at said bus firmware component, said allocated memory region;
   reading, at an operating system component, said allocated memory range and updating said IO memory management unit identity map; and
   providing access to said memory range based on said identity map.

2. The method of claim 1, further comprising validating, at said bus firmware component, with said operating system component the identity map update with the IO memory map unit identity map.

3. The method of claim 2, wherein if said process of validating results in a failed validation, said method further comprising, at said bus firmware component, introducing a safe mode wherein said allocated memory range is not accessed by a bus device.

4. The method of claim 1, wherein the IO memory management unit is used to update the IO memory management unit identity map.

5. The method of claim 4, wherein the IO memory management unit is an internal component of a chipset.

6. The method of claim 5, further comprising:
   enabling the IO memory management unit to perform IO device assignment.

7. The method of claim 6, wherein the IO device assignment comprises assigning IO devices to virtual memory locations.

8. The method of claim 5, wherein the IO memory management unit is further configured to perform Direct Memory Access remapping.

9. The method of claim 1, further comprising:
enabling the IO memory management unit to perform interrupt remapping.

10. The method of claim 1, further comprising:
enabling the IO memory management unit to report and record systems software Direct Memory Access and interrupt errors.

11. A system for updating an identity map for an IO memory management unit, said system comprising:
a pre-boot component enabled to allocate a memory region and inform bus firmware of said allocation and to update a direct memory access remapping table;
said firmware component enabled to access said allocated memory region;
an operating system component enabled to read said memory range provided by said direct memory access remapping table and update said IO memory management unit identity map; and
an IO memory management unit enabled to provide access to said memory range based on said identity map.

12. The system of claim 11, wherein said firmware component is further enabled to validate the allocated memory range.

13. The system of claim 12, wherein said bus firmware is further provided to introduce a safe mode wherein said allocated memory range is not accessible by said bus firmware if said validation fails.

14. The system of claim 11, wherein the IO memory management unit is used to update the IO memory management unit identity map.

15. The system of claim 14, wherein the IO memory management unit is an internal component of a chipset.

16. The system of claim 15, further comprising:
enabling the IO memory management unit to perform IO device assignment.

17. The system of claim 16, wherein the IO device assignment comprises assigning IO devices to virtual memory locations.

18. The system of claim 14, wherein the IO memory management unit is further configured to perform Direct Memory Access remapping.

19. The system of claim 11, further comprising:
enabling the IO memory management unit to perform interrupt remapping.

20. The system of claim 11, further comprising:
enabling the IO memory management unit to report and record systems software Direct Memory Access and interrupt errors.

* * * * *